United States Patent
Harada et al.

(10) Patent No.: US 7,554,615 B2
(45) Date of Patent: Jun. 30, 2009

(54) TRANSPARENT HARD COAT FILM, TRANSPARENT CONDUCTIVE HARD COAT FILM, TOUCH PANEL USING THIS FILM, AND LIQUID CRYSTAL DISPLAY DEVICE USING THIS TOUCH PANEL

(75) Inventors: Masahiro Harada, Tokyo (JP); Masato Saitou, Saitama (JP); Masuo Koyama, Ageo (JP); Yoshihisa Kimura, Saitama (JP)

(73) Assignee: Kimoto Co., Ltd. (JP)

( * ) Notice: Subject to any disclaimer, the term of this patent is extended or adjusted under 35 U.S.C. 154(b) by 0 days.

(21) Appl. No.: 10/385,641

(22) Filed: Mar. 12, 2003

(65) Prior Publication Data

US 2003/0174257 A1 Sep. 18, 2003

(30) Foreign Application Priority Data

Mar. 15, 2002 (JP) ............................ 2002-071640

(51) Int. Cl.
*G02F 1/1335* (2006.01)
(52) U.S. Cl. .................. 349/12; 345/173; 178/18.01
(58) Field of Classification Search ............... 349/120, 349/105, 122, 137, 106, 104, 173–183, 112; 428/421, 323
See application file for complete search history.

(56) References Cited

U.S. PATENT DOCUMENTS

| | | | | |
|---|---|---|---|---|
| 5,064,276 A | * | 11/1991 | Endo et al. ................... 349/64 |
| 5,377,027 A | * | 12/1994 | Jelley et al. ................... 349/69 |
| 5,995,180 A | * | 11/1999 | Moriwaki et al. ............. 349/96 |
| 6,016,134 A | * | 1/2000 | Ota ............................ 345/104 |
| 6,067,138 A | * | 5/2000 | Nishiguchi et al. .......... 349/117 |
| 6,154,263 A | * | 11/2000 | Bailey ......................... 349/74 |
| 6,590,622 B1 | * | 7/2003 | Nakanishi et al. ............. 349/12 |
| 6,689,458 B1 | * | 2/2004 | Mikoshiba et al. .......... 428/339 |
| 6,743,520 B2 | * | 6/2004 | Street et al. .................. 428/483 |
| 2001/0035929 A1 | * | 11/2001 | Nakamura et al. .......... 349/137 |
| 2002/0118437 A1 | * | 8/2002 | Rukavina et al. ............ 359/275 |
| 2003/0071796 A1 | * | 4/2003 | Nakanishi et al. ........... 345/173 |
| 2003/0180520 A1 | | 9/2003 | Saitou et al. ............. 428/304.4 |

OTHER PUBLICATIONS

1. What is CIE 1976 (L8 a* b*) colour space, CIE Lab. pp. 1-2.*
2. Hunter Lab. The color management company, Applications Note. p. 1.*

* cited by examiner

*Primary Examiner*—Richard H Kim
(74) *Attorney, Agent, or Firm*—Bacon & Thomas, PLLC

(57) ABSTRACT

A transparent hard coat film having excellent hardness and transmitted resolution, in which an interference fringe attributable to non-uniform thickness of the transparent hard coat layer is not noticeable, is provided. The transparent hard coat film of the invention has a transparent hard coat layer formed on at least one surface of a transparent polymer film, wherein the transparent hard coat film has a b* value in the L*a*b* color space system of 0.5 or less.

24 Claims, 2 Drawing Sheets

TRANSPARENT HARD COAT FILM, TRANSPARENT CONDUCTIVE HARD COAT FILM, TOUCH PANEL USING THIS FILM, AND LIQUID CRYSTAL DISPLAY DEVICE USING THIS TOUCH PANEL

CROSS-REFERENCE TO RELATED APPLICATIONS

Copending application Ser. No. 10/385,640, filed Mar. 12, 2003 is directed to related subject matter.

BACKGROUND OF THE INVENTION

1. Field of the Invention

The present invention relates to a transparent conductive hard coat film suitably used for a transparent touch panel, etc., and a transparent hard coat film suitable as a substrate for the transparent conductive hard coat film.

2. Related Art

In recent years, liquid crystal display devices have drawn attention as image display devices, and expected applications include portable electronic notebooks, information terminals, etc. As input devices of such portable electronic notebooks, information terminals etc., those with a transparent touch panel placed on a liquid crystal display device, in particular resistance-film type touch panels, are generally adopted in view of cost, etc.

The type of resistance-film type touch panel generally used is that having a structure in which a transparent conductive film and a glass with a transparent conductive thin layer are disposed with an appropriate gap therebetween. When the transparent conductive film disposed on the exterior is pressed with a finger or a pen and brought into contact with the glass having a transparent conductive thin layer, electric current passes at that point. Conventionally, the transparent conductive film is a transparent conductive thin layer made of indium tin oxide (referred to as "ITO", hereinafter) or the like, formed on the lower surface (surface opposed to the glass) of a substrate film, such as a plastic film.

The substrate film for such a transparent conductive film is generally a transparent hard coat film in which a transparent hard coat layer is provided on the surface of a transparent polymer film. Such a substrate film is used to improve the durability of the transparent conductive film.

In an office environment in which input devices such as portable electronic notebooks and information terminals are used, three band fluorescent lamps, with a particular wavelength having high intensity emission, are increasingly used.

The transparent hard coat films currently incorporated in touch panels, etc., undesirably exhibit an interference fringe attributable to non-uniform thickness of the transparent hard coat layer.

Such an interference fringe attributable to non-uniform thickness of the transparent hard coat layer can theoretically be avoided by completely eliminating unevenness in the transparent hard coat layer. However, it is not easy to completely eliminate the unevenness, given the accuracy of the current film formation technology.

The interference fringe attributable to non-uniform thickness of the transparent hard coat layer can also theoretically be eliminated by making the refraction index of the transparent polymer film and the refraction index of the transparent hard coat layer the same, but it is difficult to maintain the hardness of the transparent hard coat layer when its refractive index is thus selected.

Also, when a large amount of a matting agent is added to the transparent hard coat layer to make the surface uneven, the interference fringe attributable to non-uniform thickness of the transparent hard coat layer can theoretically be eliminated. However, if the surface of the transparent hard coat layer is made uneven, the resolution of images observed through the transparent hard coat film (referred to as "transmitted resolution" hereinafter) is sacrificed.

SUMMARY OF THE INVENTION

Accordingly, an object of the present invention is to provide a transparent hard coat film in which an interference fringe, due to non-uniform thickness, is not noticeable while its high hardness and transmitted resolution are maintained. Further, another object is to provide a transparent conductive hard coat film using this transparent hard coat film as a substrate film.

The inventors of the present invention have found that an interference fringe attributable to non-uniform thickness of a transparent hard coat layer can be made less noticeable by lowering the b* value of a transparent hard coat film in the CIE 1976 L*a*b* color space system. By doing so, even when there is some lack of uniformity in the thickness of the transparent hard coat layer, an interference fringe can be made less noticeable without regulating the refraction index of the transparent hard coat layer or adding a large amount of a matting agent to the transparent hard coat layer.

Specifically, the transparent hard coat film of the present invention is a transparent hard coat film obtained by providing a transparent hard coat layer on at least on one surface of a transparent polymer film, wherein the b* value of the transparent hard coat film in the CIE 1976 L*a*b* color space system is 0.5 or lower.

The CIE 1976 L*a*b* color space system refers to a method of color specification adopted by the Commission International de l'Echairage (CIE) in 1976, and the L* value, a* value, and b* value in the present invention are values obtained by measurement according to the method specified in JIS-Z8729:1994.

Further, the transparent conductive hard coat film of the present invention is a transparent conductive hard coat film obtained by providing a transparent conductive layer on at least one surface of the transparent hard coat film.

DESCRIPTION OF THE PREFERRED EMBODIMENTS

Preferred embodiments of the transparent hard coat film and the transparent conductive hard coat film of the present invention will now be described in detail.

Figure 3:
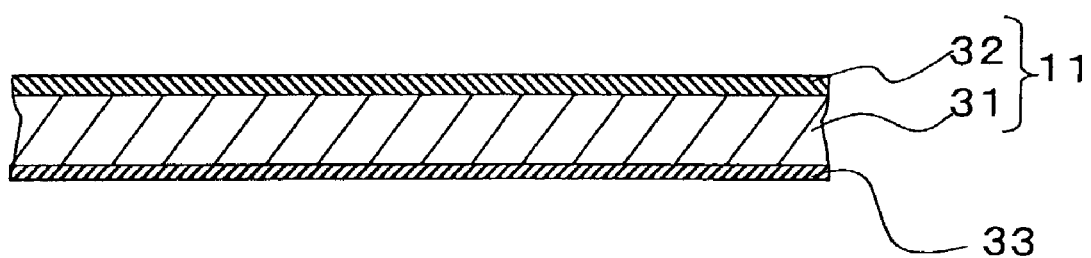
FIG. 3 is a cross-sectional view showing the structure of a transparent conductive hard coat film according to one embodiment of the present invention, which consists of a transparent conductive layer 33 on one side of a transparent hard coat film 11.
Figure 4:
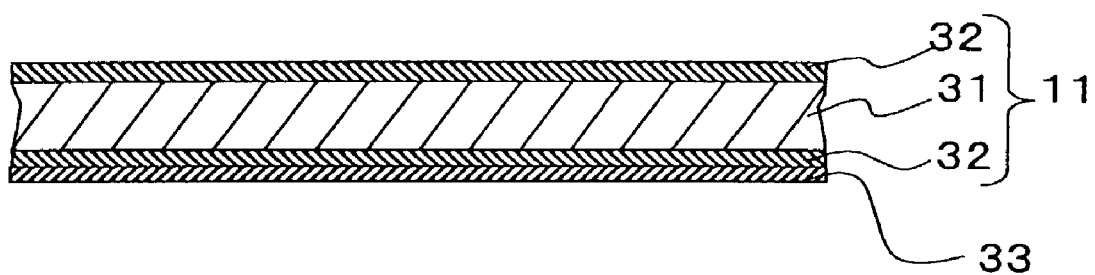
FIG. 4 is a cross-sectional view showing the structure of a transparent conductive hard coat film according to another embodiment of the present invention, which consists of a transparent conductive layer 33 on both sides of a transparent hard coat film 11.

The transparent hard coat film 11 of the present invention has a transparent hard coat layer 32 on one or both surfaces of a transparent polymer film 31 as shown in FIG. 3 and FIG. 4. The transparent hard coat film 11 may have a functional layer, which is not shown in FIG. 3 and FIG. 4, in addition to the transparent hard coat layer 32.

The transparent hard coat film 11 of the present invention has a b* value in the CIE 1976 L*a*b* color space system of 0.5 or lower, preferably 0 or lower. The CIE 1976 L*a*b* color space system is a method of color specification adopted by the Commission International de l'Echairage (CIE) in 1976, and the L* value, a* value, and b* value in the present invention are values obtained by measurement according to the method specified in JIS-Z8729. The method of JIS-Z8729 includes a method using reflected light (reflection method) and a method using transmitted light (transmittance method). The values given for the embodiments described below are those measured by the transmittance method. Values measured by reflection method may be used but, in such a case, the preferred L* value, a* value, and b* value in the CIE 1976 L*a*b* color space system are not equal to those measured by the transmittance method. Accordingly, the preferred values for measurements by the reflection method should be determined beforehand by experiment.

As is well known in the art, in the CIE 1976 L*a*b* color space system, the L* value represents lightness, and the a* value and the b* value represent hue and chromaticity. Specifically, a positive a* value indicates a red hue, and a negative a* value indicates a green hue. A positive b* value indicates a yellow hue, and a negative b* value indicates a blue hue. Further, for both the a* value and the b* value, the larger the absolute value, the higher chromaticity the color has, and the more vivid is the color. The smaller the absolute value is, the lower the chromaticity the color has. When the a* value and the b* value are both 0, an achromatic color is indicated.

The transparent hard coat film of the present invention is constructed so that yellow chromaticity is suppressed and a blue color dominates, and thereby the b* value in the CIE 1976 L*a*b* color space system becomes 0.5 or lower, preferable 0 or lower. The color specification can be adjusted by, for example, adding a colorant. It was confirmed by the experiments conducted by the present inventors that, even if the transparent hard coat layer 32 is uneven, the interference fringe thereby caused can be effectively suppressed by controlling the hue and chromaticity of the transparent hard coat film 11. Such an interference fringe can be generated when light from a color liquid crystal panel is transmitted through the transparent hard coat layer 32 and when light emitted from a three-band fluorescent lamp is reflected at the transparent hard coat layer 32. The transparent hard coat film 11 of the present invention suppresses the interference fringe generated in both cases. Thus, an interference fringe can be suppressed while the hardness and transmitted resolution of the transparent hard coat film 11 are maintained. The effect of suppressing interference fringes can be obtained by this embodiment without using the conventional techniques such as control of the refractive index of the transparent hard coat layer or addition of a matting agent to the transparent hard coat layer. However, the features of this embodiment may be combined with the other techniques such as control of the refractive index and addition of a matting agent.

Since the transparent hard coat film 11 of the present invention is used for purposes such as a touch panel of a liquid crystal display device etc., it is not desirable that its hue becomes extreme or that its lightness becomes low. Therefore, it is desirable that the L* value, which represents lightness, of the transparent hard coat film in the CIE 1976 L*a*b* color space system is 90.0 or higher, preferably 92.0 or higher. Further, it is desirable that the a* value, which represents a green or red hue and its chromaticity, is −3.0 or higher, preferably −2.0 or higher, and 1.5 or lower, preferably 1.0 or lower. Further, it is desirable that the b* value, which I represents yellow or blue hue and its chromaticness, is 0.5 or lower, preferably 0 or lower, and −4.0 or higher, preferably −3.0 or higher.

In this embodiment, as means for making the b* value of the transparent hard coat film 11 in the CIE 1976 L*a*b* color space system 0.5 or lower, preferably 0 or lower, a colorant can be added to the transparent polymer film 31 or the transparent hard coat layer 32.

As the colorant, colored inorganic pigments, organic pigments, dyestuffs and the like can be used. From the viewpoint of superior weather resistance, colored inorganic pigments such as cadmium red, red iron oxide, molybdenum red, chrome vermilion, chromium oxide, viridian, titanium cobalt green, cobalt green, cobalt chrome green, Victoria green, ultramarine, ultramarine blue, Prussian blue, Berlin blue, Milori blue, cobalt blue, Cerulean blue, cobalt silica blue, cobalt zinc blue, manganese violet, mineral violet, and cobalt violet and organic pigments such as phthalocyanine pigments are preferably used.

Any material which does not impair transparency can be used as the transparent polymer film 31. Examples of such a material include polyethylene terephthalate, polybutylene terephthalate, polyethylene naphthalate, polycarbonates, polyethylenes, polypropylenes, polystyrenes, polyalylates, cycloolefins, triacetyl cellulose, acrylics, and polyvinyl chloride. Preferred among them, is a polyethylene terephthalate film which has been oriented. In particular, biaxial orienting is preferred in view of superiority in mechanical strength and dimensional stability. It is also preferred to use a film having a surface which has been subjected to corona discharge treatment or provided with an adhesive layer to improve adhesion to the transparent hard coat layer 32. The thickness of such a transparent polymer film 31 is suitably selected depending on the material, but is generally 25-500 μm, preferably 50-200 μm.

The transparent hard coat layer 32 is not particularly limited so long as it has the required surface hardness, etc., but it is preferably formed of an ionizing radiation curable resin to impart superior hardness to the surface of the transparent polymer film 31 having low heat resistance.

Preferred ionizing radiation curable resins are ionizing radiation curable paints containing one or more types of photopolymerizable prepolymers, photopolymerizable monomers or the like. Ultraviolet radiation or electron beams can be used.

The photopolymerizable prepolymers are preferably acrylic prepolymers which have two or more acryloyl groups in one molecule and form a three dimensional network structure by curing with crosslinking. As acrylic prepolymers, urethane acrylate, polyester acrylate, epoxy acrylate, melamine acrylate and the like can be used.

Examples of the photopolymerizable monomers include dipentaerythritol hexa(meth)acrylate, trimethylolpropane (meth)acrylate, pentaerythritol tri(meth)acrylate, ethylene glycol di(meth)acrylate, triethylene glycol divinyl ether, tetraethylene glycol(meth)acrylate, tripropylene glycol(meth) acrylate, 1,4-butane diol di(meth)acrylate, 1,6-hexane diol di(meth)acrylate, neopentyl glycol di(meth)acrylate, trimethylolpropane trioxyethyl(meth)acrylate, tris(2-hydroxyethyl)isocyanurate tri(meth)acrylate.

A photopolymerization initiator, ultraviolet ray sensitizer or the like can be suitably mixed in the ionizing radiation curable paint as required. The photopolymerization initiator can be acetophenone, benzophenone, Michler's ketone, benzoin, benzyl methyl ketal, benzoin benzoate, hydroxy cyclohexylphenyl ketone, 2-methyl-1-(4-(methylthio)phenyl)-2-(4-morphonyl)-1-propane, α-acyloxime ester, thioxanthone or the like. As the ultraviolet ray sensitizer, n-butylamine, triethylamine, tri-n-butylphosphine and the like can be used.

In addition, thermoplastic resins, thermosetting resins, matting agents or the like can be added to the transparent hard coat layers 32 formed with such ionizing radiation curable resins, so long as hardness and transmittance transparent resolution are not compromised.

Examples of the thermoplastic resins include cellulose derivatives such as acetyl cellulose, nitrocellulose, acetyl butyl cellulose, ethyl cellulose, and methyl cellulose, vinyl resins such as vinyl acetate and copolymers thereof, vinyl chloride and copolymers thereof, and vinylidene chloride and copolymers thereof, acetal resins such as polyvinyl formal and polyvinyl butyral, acrylic resins such as acrylic resins and copolymers thereof and methacrylic resins and copolymers thereof, polystyrene resins, polyamide resins, linear polyester resins, polycarbonate resins.

Examples of the thermosetting resins include thermosetting urethane resins composed of acrylic polyol and isocyanate prepolymer, phenol resins, urea melamine resins, epoxy resins, unsaturated polyester resins, and silicone resins.

Further, the matting agent can be an extender pigment such as calcium carbonate, magnesium carbonate, barium sulfate, silica, aluminum hydroxide, kaolin, clay, and talc, or synthetic resin particles such as acrylic resin particles, polystyrene resin particles, polyurethane resin particles, polyethylene resin particles, benzoguanamine resin particles, or epoxy resin particles.

The thickness of the transparent hard coat layer 32 is 2 μm or more, preferably 3 μm or more, and 15 μm or less, preferably 8 μm or less. With a thickness of 2 μm or more, sufficient hardness is easily obtained. With a thickness of 15 μm or less, the transparent hard coat film 11 consisting of transparent hard coat layer 32 on only one surface of the transparent polymer film 31 is kept from curling.

The ionizing radiation used to cure the radiation curable paint, may be ultraviolet light emitted from an extra-high pressure mercury lamp, high pressure mercury lamp, low pressure mercury lamp, carbon arc, metal halide lamp or the like, in a wavelength region of 100-400 nm, preferably 200-400 nm, or electron beams emitted from a scanning-type or curtain-type electron beam accelerator in a wavelength region of 100 nm or shorter.

The transparent conductive hard coat film of the present invention is obtained by providing a transparent conductive thin layer 33 on at least one surface of the transparent hard coat film 11 of the present invention, as shown in FIG. 3 and FIG. 4. Thus, the transparent hard coat film 11 of the present invention becomes a transparent conductive hard coat film having conductivity.

The transparent conductive thin layer 33 provided on at least one surface of the transparent hard coat film 11 may be a generally known transparent conductive material. For example, transparent conductive substances such as indium oxide, tin oxide, indium tin oxide, gold, silver, and palladium can be used. These can be formed into a thin layer on a transparent hard coat film 11 by the vacuum deposition method, sputtering, ion plating, solution coating, or the like. Further, an organic conductive material can be also used as the transparent conductive thin layer 33. In particular, transparent conductive materials containing any of indium oxide, tin oxide, and indium tin oxide as the main component, which are superior in transparency and conductivity and which can be obtained at a relatively low cost, are preferred. Although such a transparent conductive thin layer 33 containing indium oxide, tin oxide, or indium tin oxide as the main component shows a light yellowish color, the yellowish color of the transparent conductive thin layer is made less noticeable because the transparent hard coat film 11 of the present invention has a b* value in the CIE 1976 L*a*b* color space system of 0.5 or lower.

Although dependent on the material, it is desirable that the thickness of the transparent conductive thin layer shows a surface resistivity of 1000Ω or lower, preferably 500Ω or lower, and is in the range of 10 nm or more, preferably 20 nm or more, and 80 nm or less, preferably 70 nm or less, in consideration of cost. In such a thin layer, an interference fringe of visible light attributable to non-uniform thickness of the transparent conductive thin layer 33 is hardly noticeable.

Figure 1:
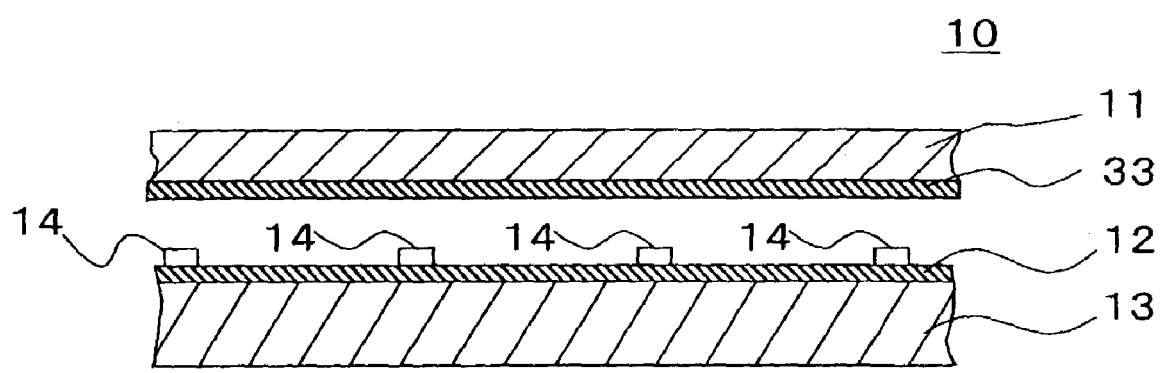
FIG. 1 is a cross-sectional view of a touch panel 10 according to an embodiment of the present invention.
Figure 2:
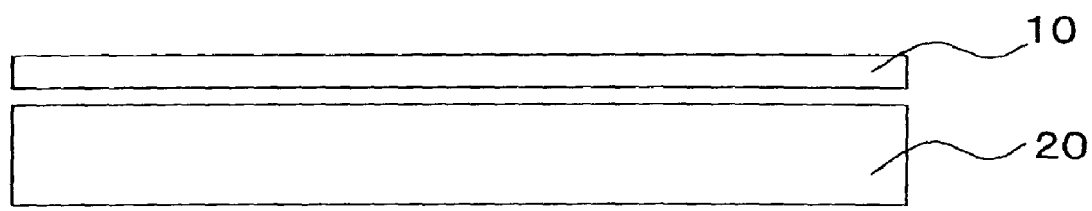
FIG. 2 is a cross-sectional view of a liquid crystal display device with the touch panel according to an embodiment of the present invention.

As shown in FIG. 1, a resistance-film type touch panel 10 can be constructed by forming a transparent conductive thin layer 33 on the transparent hard coat film 11 of the present invention and joining a glass substrate 13 on which a transparent conductive thin layer 12 has been formed so that the transparent conductive thin layers are opposed to each other with a certain gap therebetween. At the ends of the transparent hard coat film 11 and the glass substrate 13, there are provided electrodes (not shown in FIG. 1). When a user presses the transparent hard coat film 13, having the transparent conductive thin layer 33, with a finger or pen, the transparent conductive thin layer 33 comes into contact with the transparent conductive thin layer 12. The touch panel 10 is constructed so as to detect this electric contact through the electrodes at the end, and thus detect the position being pressed. The dotted spacers 14 may be provided on the transparent conductive thin layer 12 of the glass substrate 13 as required. Further, as shown in FIG. 2, a liquid crystal display device with a touch panel can be constructed by mounting the touch panel 10 shown in FIG. 1 on a color liquid crystal panel 20. In the touch panel 10 of this embodiment, formation of interference fringes attributable to non-uniform thickness or the transparent hard coat layer 32 can be suppressed as described above. In addition, an interference fringe (the Newton ring) caused by change of the gap (distance) between the surface of the glass substrate 13 with a transparent conductive thin layer 13 and the opposed surface of the transparent conductive hard coat film 11, when the touch panel 10 is pressed, can be suppressed. Further, since the transparent hard coat film 11 of the present invention has high hardness and high transmitted resolution, the touch panel 10 can be imparted with high durability, and the display of the liquid crystal panel clear can be seen clearly.

As the material of the transparent conductive thin layer formed on the transparent hard coat film, generally used is indium tin oxide (ITO), whose thin film has a tendency to show a light yellow color. This tendency of ITO emphasizes an interference fringe attributable to non-uniform thickness of the transparent hard coat layer. However, the emphasized interference fringe is suppressed by the transparent conductive hard coat film of the present invention for the reasons which follow.

The ITO thin layer generally shows a light yellow color when observed with either transmitted light or reflected light. Showing a light yellow color means that the ITO thin layer absorbs blue, and transmits or reflects light with wavelengths of green and red. Therefore, when the transparent hard coat film 11 is completely transparent and the transparent hard coat layer 32 has non-uniform thickness, light with wavelengths of green and red transmitted through or reflected at the ITO thin layer undergoes interference at the transparent hard coat layer, and an interference fringe is formed. However, this interference fringe is not strong if the intensity of the transmitted green and red light is distributed over a wide range of wavelengths. However, since the intensity distribution of the light emitted from the color liquid crystal panel or three band fluorescent lamps has a sharp peak at particular wavelengths of green and red, each light having these particular wavelengths at the transparent hard coat layer 32 interferes with light reflected by the ITO thin layer or transmitted through the ITO thin layer, and thus a strong interference fringe is observed. When the transparent hard coat film 11 of the present invention is used, however, since it is designed so that the b* value of the color in the CIE 1976 L*a*b* color space system is 0.5 or lower, that is, yellow chromaticity is low and a blue color dominates, blue light is transmitted or reflected but light having at wavelengths of green and red is absorbed. Therefore, light with particular wavelengths of green and red transmitted through or reflected by the ITO film is absorbed by the transparent hard coat film 11 and thereby interference with these wavelengths of green and red at the transparent hard coat layer 32 can be reduced.

In other words, the transparent hard coat film 11 of the present invention is designed to have a hue that is a color complementary to the hue of a film formed thereon (here, the transparent conductive film 32). Consequently, since a gray tone is generated as a whole, strong interference by light at particular wavelengths can be prevented.

The transparent hard coat film 11 itself suppresses an interference fringe attributable to non-uniform thickness of the transparent hard coat layer 32, even if the transparent conductive thin layer 33 is not formed thereon. Therefore, the transparent hard coat film 11 is not limited to use as a substrate film for the transparent conductive thin layer 33.

As described above, according to the present invention, there can be provided a transparent hard coat film 11 in which an interference fringe attributable to non-uniform thickness of the transparent hard coat layer 32 is made less noticeable by regulating the hue and chromaticity so that the b* value of the transparent hard coat film 11 in the CIE 1976 L*a*b* color space system is 0.5 or lower, even when the transparent hard coat layer 32 has some non-uniformity in thickness. Consequently, the interference fringe can be suppressed without controlling the refractive index of the transparent hard coat layer 32 or adding a large amount of a matting agent to the transparent hard coat layer 32.

Further, according to the present invention, the Newton ring generated when the transparent conductive hard coat films adhere to each other, or the transparent conductive hard coat film adheres to the glass surface with a transparent conductive thin layer, can be made less noticeable. Further, according to the present invention, there can be provided a transparent conductive thin layer in which a yellowish color is not noticeable.

EXAMPLES

Examples of the present invention will be presented wherein "part" and "%" are used on a weight basis unless otherwise indicated.

Examples 1-7

In Examples 1-7, a transparent hard coat film 11 having a transparent hard coat layer 32 on one side of a transparent polymer film 31, and a transparent conductive hard coat film having a transparent conductive thin layer 33 on one side of hard coat film 11 were respectively produced as shown in FIG. 3. The type and quantity of pigment used for the transparent hard coat layer 32 differed for each of Examples 1-7.

First, as the transparent polymer films 31, polyethylene terephthalate films (COSMO SHINE A4300: Toyobo Co., Ltd.) having a thickness shown in Table 1 were prepared. Next, coating solutions (a) for transparent hard coat layer 32 having the following compositions, each of which containing a pigment as shown in Table 1 (colored inorganic pigment), in an amount as shown in Table 1, were prepared for Examples 1-7. Each of the coating solutions (a) was applied to one surface of a transparent polymer film 31, dried, and irradiated with ultraviolet light from a high pressure mercury lamp for 1-2 seconds to form a transparent hard coat layer 32 having a thickness of about 5 μm. Thus, transparent hard coat films 11 of Examples 1-7 having the transparent hard coat layer 32 on one side of the transparent polymer film 31 were produced.

Subsequently, a transparent conductive thin layer 33 made of indium tin oxide (ITO), having a surface resistivity of about 400Ω was formed by sputtering on one surface of the transparent polymer film 31 of the transparent hard coat film 11, which one surface is opposite the surface provided with the transparent hard coat layer 32 thereon, in each of Examples 1-7. Thus, transparent conductive hard coat films, as shown in FIG. 3, were produced.

| Coating solution (a) for transparent hard coat layer | |
|---|---|
| Ionizing irradiation curable resin (DIABEAM UR6530: Mitsubishi Rayon Co., Ltd.) | 60 Parts |
| Colored inorganic pigment (product's name and content are shown in Table 1) | |
| Photopolymerization initiator (IRGACURE 651: Ciba Specialty Chemicals K.K.) | 1.8 Parts |
| Methyl ethyl ketone | 80 Parts |
| Toluene | 60 Parts |

Examples 8 and 9

In Examples 8 and 9, a transparent hard coat film 11 having a transparent hard coat layer 32 on each side of a transparent polymer film 31, and a transparent conductive hard coat film having a transparent conductive thin layer 33 on both sides of a transparent hard coat film 11 were produced as shown in FIG. 4. The type and content of the pigment used for the transparent hard coat layer 32 were different in Examples 8 and 9.

The transparent polymer films 31 were polyethylene terephthalate films (COSMOSHINE A4300: Toyobo Co., Ltd.) having a thickness shown in Table 1. Coating solutions (b) for transparent hard coat layer 32 having a colored inorganic pigment in an amount shown in Table 1, were prepared for Examples 8 and 9. Each of the coating solutions (b) was applied to both surfaces of the transparent polymer film 31, dried, and irradiated with ultraviolet light from a high pressure mercury lamp for 1-2 seconds to form a transparent hard coat layer 32 having a thickness of about 5 μm. Thus, the transparent hard coat films 11 of Examples 8 and 9 having the transparent hard coat layer 32 on both sides of the transparent polymer film 31 were produced.

Subsequently, a transparent conductive thin layer 33 made of indium tin oxide (ITO) having a surface resistivity of about 400Ω was formed by sputtering on the surface of one of the transparent hard coat layers 32 of the transparent hard coat films 11 of each of Examples 8 and 9. Thus, transparent conductive hard coat films, as shown in FIG. 4, were produced.

| Coating solution (b) for transparent hard coat layer | |
|---|---|
| Ionizing irradiation curable resin (DIABEAM UR6530: Mitsubishi Rayon Co., Ltd.) | 58 Parts |
| Colored inorganic pigment (product's name and content are shown in Table 1) | |
| Photopolymerization initiator (IRGACURE 651: Ciba Specialty Chemicals K.K.) | 1.8 Parts |
| Thermoplastic acetal resin (S-LEC BL-S: Sekisui Chemical Co., Ltd.) | 2 Parts |
| Porous silica particles (Sylysia 446, mean particle diameter 4.5 μm, Fuji Silysia Chemical Ltd.) | 1 Part |
| Fine powder silica particles (Aerosil 30, mean particle diameter 50 nm, Nippon Aerosil Co., Ltd.) | 1 Part |
| Methyl ethyl ketone | 80 Parts |
| Toluene | 60 Parts |

Comparative Examples 1-6

In Comparative Examples 1-6, transparent hard coat films and transparent conductive hard coat films were produced in the same manner as those in Examples 1-7 except that different amounts of the colored inorganic pigment were used as shown in Table 1. In Comparative Examples 1 and 6, coating solutions that contained no colored inorganic pigment were used.

Comparative Examples 7 and 8

In Comparative Example 7, a transparent hard coat film and a transparent conductive hard coat film were produced in the same manner as those of Examples 8 and 9 except that the colored inorganic pigment was removed from coating solution (b) used in Examples 8 and 9.

In Comparative Example 8, a transparent hard coat film and a transparent conductive hard coat film were produced in the same manner as those of Examples 8 and 9 except that the colored inorganic pigment of the coating solution (b) used in Examples 8 and 9 was changed as shown in Table 1.

TABLE 1

| | thickness of polyethylene terephthalate films (μm) | Colored inorganic pigment Product's name: Manufacturer | Parts |
|---|---|---|---|
| (One-Side-Type) | | | |
| Example 1 | 188 μm | UltramarineNo2000: Daiichi Kasei | 0.4 |
| Example 2 | 188 μm | FPGS-3RBlue: Dainichiseika | 0.04 |
| Example 3 | 125 μm | FINALVIOLET D6060: BASF Ltd. | 0.008 |
| Example 4 | 125 μm | FINALVIOLET D6060: BASF Ltd. | 0.012 |
| Example 5 | 188 μm | UltramarinePR-75: Daiichi Kasei | 0.04 |
| Example 6 | 188 μm | UltramarineNo2000: Daiichi Kasei | 0.8 |
| Example 7 | 188 μm | Heliogen Blue D6700T: BASF Ltd. | 0.04 |
| Com. Ex. 1 | 188 μm | NOT USED | NOT USED |
| Com. Ex. 2 | 188 μm | UltramarineZ3-254: Dainichiseika | 0.04 |
| Com. Ex. 3 | 188 μm | UTCO-051Blue: Dainichiseika | 0.04 |
| Com. Ex. 4 | 188 μm | UltramarineNo2000: Daiichi Kasei | 0.2 |
| Com. Ex. 5 | 188 μm | Mirori Blue 671: Dainichiseika | 0.04 |
| Com. Ex. 6 | 125 μm | NOT USED | NOT USED |
| (Both-Side-Type) | | | |
| Example 8 | 188 μm | UltramarineNo2000: Daiichi Kasei | 0.75 |
| Example 9 | 188 μm | UltramarineNo2000: Daiichi Kasei | 1.1 |
| Com. Ex. 7 | 188 μm | NOT USED | NOT USED |
| Com. Ex. 8 | 188 μm | UltramarineNo2000: Daiichi Kasei | 0.35 |

Explanatory notes in Table 1
Com. Ex.: Comparative Example
Daiichi Kasei: Daiichi Kasei CO., LTD
Dainichiseika: Dainichiseika Color & Chemicals Mfg. Co., LTD Evaluation The L* values, a* values, and b* values in the CIE 1976 L*a*b* color space system for the transparent hard coat films 11 (on which no transparent conductive thin layer 33 was formed), thus obtained in Examples 1-9 and Comparative Examples 1-8, were measured by the transmittance method using an SM Color Computer SM-4 ("Suga Test Instruments Co., Ltd.). The results are shown in Table 2. Further, light from a three band fluorescent lamp was irradiated onto the transparent hard coat films 11 (on which the transparent conductive thin layer 33 was not provided) and "interference fringes", which occurred in reflected light and were attributable to non-uniform thickness of the transparent hard coat layers 32, were visually observed in the position where the reflected image of the three band fluorescent lamp could be observed. The results of evaluation are shown in Table 2. In the table "o" indicates that no interference fringe was noticeable, and "x" indicates that an interference fringe was noticeable.

Further, two identical films for each of the transparent conductive hard coat films (on which the transparent conductive thin layer 33 was provided) obtained in Examples 1-9 and Comparative Examples 1-8 were prepared. These films were laminated so that respective surfaces on which the transparent conductive thin layer 33 was provided were opposed to each other, and allowed to adhere to each other. In these films, "the Newton rings" generated due to interference by reflected light in the respective film surfaces were visually observed. The results of evaluation are shown in Table 2. In the table, "o" indicates that the Newton ring was unnoticeable, and "x" indicates that the Newton ring was noticeable.

TABLE 2

| | L* value, a* value, and b* value in CIE 1976 L*a*b* color space system | | | Occurrence of interference fringe | Occurrence of Newton ring |
|---|---|---|---|---|---|
| | L* value | a* value | B* value | | |
| one-side-type | | | | | |
| Example 1 | 95.09 | −0.51 | 0.43 | ○ | ○ |
| Example 2 | 95.28 | −0.83 | 0.41 | ○ | ○ |
| Example 3 | 96.26 | −0.04 | −0.08 | ○ | ○ |
| Example 4 | 96.33 | −0.07 | −0.15 | ○ | ○ |
| Example 5 | 94.13 | −3.06 | −0.19 | ○ | ○ |
| Example 6 | 94.45 | −0.86 | −0.26 | ○ | ○ |
| Example 7 | 94.45 | −1.27 | −0.88 | ○ | ○ |
| Com. Ex. 1 | 95.49 | −1.46 | 1.33 | X | X |
| Com. Ex. 2 | 95.89 | −0.18 | 1.01 | X | X |
| Com. Ex. 3 | 95.90 | −0.20 | 1.00 | X | X |
| Com. Ex. 4 | 95.53 | −0.33 | 0.79 | X | X |
| Com. Ex. 5 | 95.66 | −0.55 | 0.67 | X | X |
| Com. Ex. 6 | 96.59 | −0.10 | 0.51 | X | X |
| both-side-type | | | | | |
| Example 8 | 93.29 | −0.82 | 0.49 | ○ | ○ |
| Example 9 | 92.69 | −1.12 | −0.05 | ○ | ○ |
| Com. Ex. 7 | 94.42 | −0.03 | 1.90 | X | X |
| Com. Ex. 8 | 93.86 | −0.42 | 1.21 | X | X |

Explanatory notes in Table 2
Com. Ex.: Comparative Example

As will be understood from the results in Table 2, since the b* values of the transparent hard coat films 11 (no transparent conductive thin layer 33) obtained in Examples 1-9 were 0.5 or lower, in the CIE 1976 L*a*b* color space system as a transparent hard coat film 11, the interference fringes attributable to non-uniform thickness of the transparent hard coat layer 32 were hardly noticeable. Further, since the refractive index of the transparent hard coat layers 32 was not controlled to make interference fringes less noticeable in the transparent hard coat layers 32 in the transparent hard coat films 11 obtained in Examples 1-9, their hardness was not reduced and their durability was sufficient. Further, since a large amount of a matting agent was not added to the transparent hard coat layers 32 in the transparent hard coat films 11 obtained in Examples 1-9, their transmitted resolution was not compromised.

Further, when the transparent conductive hard coat films obtained in Examples 1-9 were laminated with surfaces of the transparent conductive thin layers 33 adhered to each other, the Newton rings were hardly noticeable because the transparent conductive hard coat films 11 each had a b* value of 0.5 or lower in the CIE 1976 L*a*b* color space system. Further, since the transparent conductive hard coat films used, as substrates, transparent hard coat films 11 having b* values of 0.5 or lower in the CIE 1976 L*a*b* color space system, the yellowish color of the transparent conductive thin layers 33 was not very noticeable.

On the other hand, since the b* values of the transparent conductive hard coat films obtained in Comparative Examples 1-8 exceeded 0.5 in the CIE 1976 L*a*b* color space system, interference fringes attributable to non-uniform thickness of the transparent hard coat layers were noticeable.

Further, when the transparent conductive hard coat films obtained in Comparative Examples 1-8 were laminated so that surfaces of the transparent conductive thin layers adhered to each other, the Newton rings became easily noticeable, because the transparent conductive hard coat films used, as substrates, transparent hard coat films in which the b* values exceeded 0.5 in the CIE 1976 L*a*b* color space system. Further, the transparent conductive hard coat films obtained in Comparative Examples 1-8 used, as substrates, transparent hard coat films having b* values which exceeded 0.5 in the CIE 1976 L*a*b* color space system, the yellowish color of the transparent conductive thin layers was noticeable.

The invention claimed is:

1. A transparent hard coat film having a transparent conductive thin layer on at least one surface thereof, said transparent hard coat film comprising a transparent polymer film and a transparent hard coat layer provided at least on one surface of said transparent polymer film,
    wherein said transparent hard coat layer contains a colorant providing a combination consisting of the transparent polymer film and the transparent hard coat layer on at least one surface thereof with a hue which is a color complementary to a hue of said transparent conductive thin layer and a L* value of at least 90 in the CIE 1976 L*a*b* color space system, as measured using transmitted light;
    wherein the combination consisting of the transparent polymer film and the transparent hard coat layer on at least one surface thereof has a b* value −4.0 or higher and less than 0, and an a* value −3.0 or higher and 1.5 or lower in the CIE 1976 L*a*b* color space system, as measured using transmitted light; and
    wherein the colorant provides the b* value.

2. A touch panel comprising a transparent hard coat film and a transparent substrate disposed opposing each other with a gap therebetween, and transparent conductive thin layers formed on the film,
    wherein said transparent hard coat film comprises a transparent polymer film and a transparent hard coat layer provided on at least one surface of the transparent polymer film, and
    wherein a combination consisting of the transparent polymer film and the transparent hard coat layer on at least one surface thereof has a b* value less than 0 in the CIE 1976 L*a*b* color space system, as measured using transmitted light; and
    wherein the hard coat layer contains a colorant providing the b* value.

3. The touch panel according to claim 2, wherein said combination has a b* value of −4.0 or higher, an L* value of 90.0 or higher, and an a* value of −3.0 or higher and 1.5 or lower in the CIE 1976 L*a*b* color space system, as measured using transmitted light.

4. The touch panel according to claim 2 wherein L* is at least 90 in the CIE 1976 L*a*b* color space system, as measured using transmitted light.

5. The touch panel according to claim 2 wherein a surface of the transparent hard coat layer is an outermost surface of the touch panel, exposed for contact by touch.

6. The touch panel according to claim 2, wherein the transparent hard coat film consists of the transparent polymer film and the transparent hard coat layer on only one surface of the transparent hard coat film.

7. The touch panel according to claim 2, wherein the colorant is selected from the group consisting of colored inorganic pigments, organic pigments and dyestuffs.

8. The touch panel according to claim 2, wherein the colorant is selected from the group consisting of cadmium red, red iron oxide, molybdenum red, chrome vermilion, chromium oxide, viridian, titanium cobalt green, cobalt green, cobalt chrome green, Victoria green ultramarine, ultramarine blue, Prussian blue, Berlin blue, Milori blue, cobalt blue, Cerulean blue, cobalt silica blue, cobalt zinc blue, manganese violet, mineral violet, cobalt violet and phthalocyanine pigments.

9. The transparent hard coat film according to claim 1 having a blue hue.

10. The transparent hard coat film according to claim 1, consisting of the transparent polymer film and the transparent hard coat layer on only one surface of the transparent hard coat film.

11. The transparent hard coat film according to claim 1, wherein the colorant is selected from the group consisting of colored inorganic pigments, organic pigments and dyestuffs.

12. The transparent hard coat film according to claim 1 wherein the colorant is selected from the group consisting of cadmium red, red iron oxide, molybdenum red, chrome vermilion, chromium oxide, viridian, titanium cobalt green, cobalt green, cobalt chrome green, Victoria green, ultramarine, ultramarine blue, Prussian blue, Berlin blue, Milori blue, cobalt blue, Cerulean blue, cobalt silica blue, cobalt zinc blue, manganese violet, mineral violet, cobalt violet and phthalocyanine pigments.

13. A liquid crystal display device comprising a color liquid crystal panel and a touch panel disposed thereon,
   wherein said touch panel comprises a transparent hard coat film and a transparent substrate disposed opposing each other with a gap therebetween, and transparent conductive thin layers formed on the respective opposed surfaces of said transparent hard coat film and said transparent substrate,
   wherein said transparent hard coat film comprises a transparent polymer film and a transparent hard coat layer provided on at least one surface of said transparent polymer film, and
   wherein a combination consisting of the transparent polymer film and the transparent hard coat layer on at least one surface thereof has a b* value less than 0 in the CIE 1976 L*a*b* color space system, as measured using transmitted light; and
   wherein the hard coat layer contains a colorant providing the b* value.

14. The liquid crystal display device according to claim 13, wherein said combination has a b* value of −4.0 or higher, an L* value of 90.0 or higher, and an a* value of −3.0 or higher and 1.5 or lower in the CIE 1976 L*a*b* color space system, as measured using transmitted light.

15. The liquid crystal display device according to claim 13 wherein L* is at least 90 in the CIE 1976 L*a*b* color space system, as measured using transmitted light.

16. The liquid crystal display device according to claim 13 wherein a surface of the transparent hard coat layer is an outermost surface of the touch panel, exposed for contact by touch.

17. The liquid crystal display device according to claim 13, wherein the transparent hard coat film consists of the transparent polymer film and the transparent hard coat layer on only one surface of the transparent hard coat film.

18. The liquid crystal display device according to claim 13, wherein the colorant is selected from the group consisting of colored inorganic pigments, organic pigments and dyestuffs.

19. The liquid crystal display device according to claim 13, wherein the colorant is selected from the group consisting of cadmium red, red iron oxide, molybdenum red, chrome vermilion, chromium oxide, viridian, titanium cobalt green, cobalt green, cobalt chrome green, Victoria green ultramarine, ultramarine blue, Prussian blue, Berlin blue, Milori blue, cobalt blue, Cerulean blue, cobalt silica blue, cobalt zinc blue, manganese violet, mineral violet, cobalt violet and phthalocyanine pigments.

20. A touch panel comprising a transparent hard coat film and a transparent substrate disposed opposing each other with a gap therebetween, and transparent conductive thin layers formed on the respective opposed surfaces of said transparent hard coat film and said transparent substrate,
   wherein said transparent hard coat film comprises a transparent polymer film and a transparent hard coat layer provided on at least one surface of the transparent polymer film,
   wherein a combination consisting of the transparent polymer film and the transparent hard coat layer on at least one surface thereof has a hue which is a color complementary to a hue of said transparent conductive thin layer formed thereon; and
wherein said combination has a b* value of −4.0 or higher and less than 0 an L* value is 90.0 or higher, and an a* value is −3.0 or higher and 1.5 or lower in the CIE 1976 L*a*b* color space system, as measured using transmitted light; and
   wherein the hard coat layer contains a colorant providing the b* value.

21. The touch panel according to claim 20 wherein a surface of the transparent hard coat layer is an outermost surface of the touch panel, exposed for contact by touch.

22. The touch panel according to claim 20, wherein the transparent hard coat film consists of the transparent polymer film and the transparent hard coat layer on only one surface of the transparent hard coat film.

23. The touch panel according to claim 20, wherein the colorant is selected from the group consisting of colored inorganic pigments, organic pigments and dyestuffs.

24. The touch panel according to claim 20, wherein the colorant is selected from the group consisting of cadmium red, red iron oxide, molybdenum red, chrome vermilion, chromium oxide, viridian, titanium cobalt green, cobalt green, cobalt chrome green, Victoria green ultramarine, ultramarine blue, Prussian blue, Berlin blue, Milori blue, cobalt blue, Cerulean blue, cobalt silica blue, cobalt zinc blue, manganese violet, mineral violet, cobalt violet and phthalocyanine pigments.

* * * * *